US012122491B2

(12) United States Patent
McNulty

(10) Patent No.: US 12,122,491 B2
(45) Date of Patent: Oct. 22, 2024

(54) ELECTRONIC SAIL SHAPE SENSOR NETWORK AND METHOD OF OPERATING THE SAME FOR SINGLE AND MULTI-SAIL CONFIGURATIONS

(71) Applicant: Sean McNulty, Triangle, VA (US)

(72) Inventor: Sean McNulty, Triangle, VA (US)

( * ) Notice: Subject to any disclaimer, the term of this patent is extended or adjusted under 35 U.S.C. 154(b) by 0 days.

(21) Appl. No.: 18/124,570

(22) Filed: Mar. 21, 2023

(65) Prior Publication Data

US 2023/0406462 A1   Dec. 21, 2023

Related U.S. Application Data

(63) Continuation of application No. 16/655,187, filed on Oct. 16, 2019, now Pat. No. 11,628,915.

(60) Provisional application No. 62/746,548, filed on Oct. 16, 2018.

(51) Int. Cl.
*B63B 49/00*     (2006.01)
*B63H 9/067*     (2020.01)
*G01L 5/13*      (2006.01)

(52) U.S. Cl.
CPC .............. *B63B 49/00* (2013.01); *B63H 9/067* (2020.02); *G01L 5/133* (2013.01)

(58) Field of Classification Search
CPC ........... B63B 9/00; B63B 15/00; B63B 35/00; B63B 49/00; B63H 9/00; B63H 9/067; G01L 5/047; G01L 5/133

USPC ........................................................... 701/21
See application file for complete search history.

(56) References Cited

U.S. PATENT DOCUMENTS

| | | | | |
|---|---|---|---|---|
| 6,308,649 | B1 * | 10/2001 | Gedeon .................. | B63B 49/00 701/21 |
| 10,118,670 | B2 * | 11/2018 | Chatterton .............. | G01L 5/047 |
| 11,628,915 | B1 * | 4/2023 | McNulty ................. | B63B 49/00 701/21 |

* cited by examiner

*Primary Examiner* — Lars A Olson
(74) *Attorney, Agent, or Firm* — Tangent Law Group, PLLC; Eric J. Weierstall, esq.

(57) ABSTRACT

The instant invention describes devices and methods of measuring the differential air pressure at numerous representative points across the surface of the sail or sails and providing visual feedback of areas of ideal laminar flow and areas of less than optimal airflow with a calculation of thrust and providing an indication the maximal differential airflow and thrust. The invention utilizes an array of sensors that detect minute variations in barometric pressure and other data on each side of the sail surface. These sensors are connected together to form a network or net across the sail. This connection can be physical, using wires, or it may be wireless, using for example, but certainly not being limited to, Bluetooth LE 5.0 or other wireless topologies or technologies. This can be extended over multiple sails and monitor not only the sail but the interaction of the sails. Finally it can utilize a combination of wired and wireless connections to fit individual situations and can couple with existing terrestrial and satellite ship networks.

7 Claims, 9 Drawing Sheets

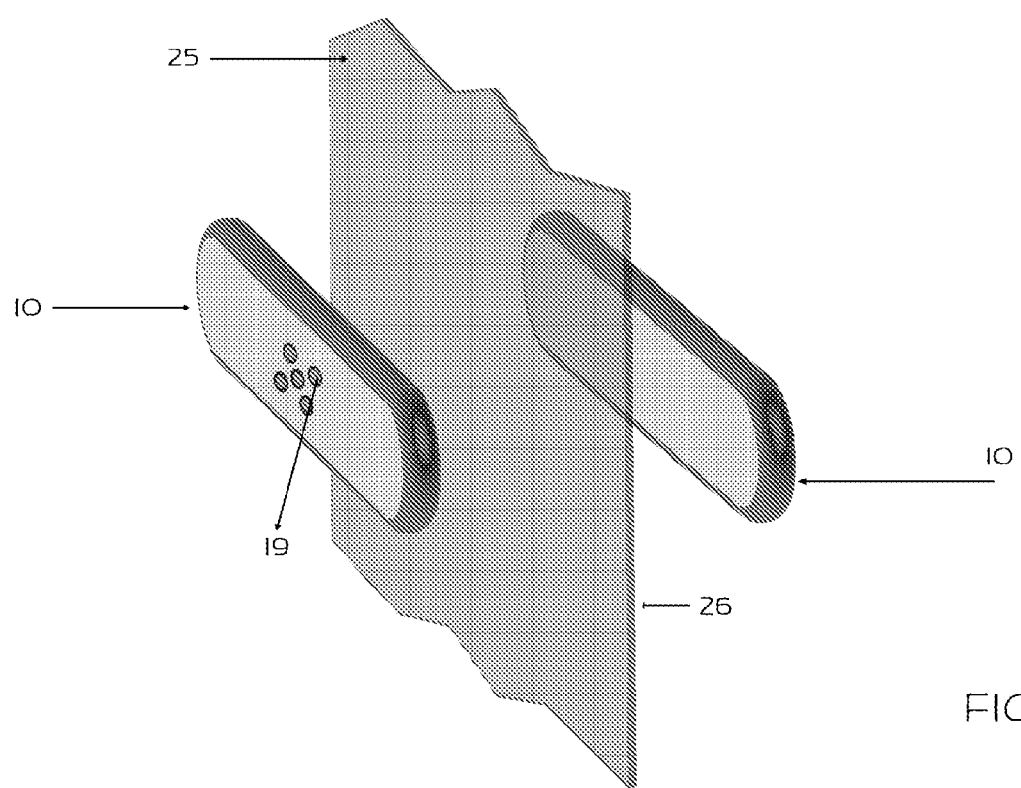
FIG. IC

ELECTRONIC SAIL SHAPE SENSOR NETWORK AND METHOD OF OPERATING THE SAME FOR SINGLE AND MULTI-SAIL CONFIGURATIONS

CROSS-REFERENCE TO RELATED APPLICATIONS

This application is filed as a continuation of U.S. patent application Ser. No. 16/655,187 file Oct. 16, 2019, which in turn claims the priority of U.S. provisional patent application 62/746,548, filed Oct. 16, 2018, which are incorporated herein by reference.

BACKGROUND OF THE INVENTION

Sailboats usually have a number of sails, broadly meaning cloth, canvas, Kevlar, composites or other fabrics that flex and/or articulate and non-articulated wings, hereafter referred to simply as sails that serve as a source of propulsion. In order to achieve the highest efficiency from a sail, the sails must be "trimmed" or adjusted via a number of controls to optimize sail shape for any given environmental condition. These conditions change frequently and trim control adjustments are made to maintain the maximum efficiency in the propulsion of the boat.

These controls typically comprise a number of ropes, or lines, or "sheets" in sailing terms, that tighten or loosen the sail from its front edge to its rear edge (luff to leech) or apply tension vertically from the top of the sail to the bottom (head to foot) and horizontal from side to side (outhaul). Sails are designed to take advantage of the Bernoulli principle and other physical principals, similar to airplane wings, essentially creating an idealized airfoil. By varying the shape of the sail such that it has camber from front to back the profile for the given sail can be idealized for the wind conditions and position of the boat relative to the direction of the wind. Typically, the more camber, the more forward thrust and opposing drag is created, up to a point where the induced drag becomes sufficient to be detrimental. Additionally, the sail must be situated at an angle about its vertical axis so as to create an "angle of attack" relative to the apparent wind. At angles of attack that are too great, the sail "stalls". At the proper angle of attack, laminar airflow over the greatest front to back distance over the sail is created, producing optimum forward thrust Though similar to airplane wings in general principal, the deployment of the sail at a single altitude and mounted to the sailboat in a different fashion as well as the ability of the typical fabric sail to more quickly and efficiently change camber coupled with the difference in safety factors makes the problem addressed by the invention more unique to sailing.

The proper laminar airflow over the airfoil or sail creates maximum air pressure on the "inside" surface of the sail and minimal air pressure on the "outside" of the surface of the sail. This pressure differential is responsible for lift or forward thrust induced by the sail. The greater the differential across the maximal area of the sail, the greater the thrust produced. Thus by trimming the sail and adjusting the camber to maximize laminar flow over the sail, maximum thrust is produced.

To achieve proper sail shapes and allow for the idealized trim of the sail, sail makers design the sail such that they have the proper basic shape with respect to camber and such that maximum camber is typically in the forward 40 to 50% range from front to back. The position of this maximum camber can be adjusted to some degree on most sails.

Sailmakers also typically sew into the sail small strips of yarn or ribbon that flow rearward when airflow is ideal across a portion of the sail. These are referred to as "telltales", "woolies" and other names based on the region being sailed.

Obtaining the ideal sail shape in current conditions is often left to the experience of the captain and crew and visualizing the angle of attack and the laminar nature of the flow on the sail which has typically been done by observing the shape of the sail and the flow of the telltales. This combined with adjustments and/or selection of the initial camber of the sail allows experienced crews to attempt to maximize thrust from their boat.

However, there are significant limitations in these methods in that they rely on subjective reasoning and visual clues that are not very accurate or representative of the ideal laminar airflow across the entire surface of the sail. Existing methods and models infer but do not directly measure airflow across the surface. Moreover, as they infer the measure of airflow, either by observation via the human eye or camera systems which rely on indicators on the sails, the ability to fully and quickly visualize the state of the sail or how one sail affects the others is very difficult and requires significant experience with the sail package, the boat, and the craft of sailing. A need exists to assist experienced and inexperienced crews alike to visualize in real time the pressure changes on the sale and idealized trim settings to improve the performance of sails.

The instant invention describes devices and methods of measuring the differential air pressure at numerous representative points across the surface of the sail and providing visual feedback of areas of ideal laminar flow and areas of less than optimal airflow with an indication of how the sail must be adjusted to create the maximal differential in airflow.

The invention anticipates eventual interface with sail controls in an automated fashion using existing shipboard data networks. One such purpose would be to allow for automated trimming of sails which would provide for the greatest efficiency from deployed sails in racing, pleasure, and commercial settings. A further aspect of the invention would be for use in sail designing and the interaction of airflow over multi-sail rigs. A still further aspect would be to provide for an interface and/or readout to experienced crews such that the entirety of the sail may be monitored and adjustments made more expediently.

BRIEF DESCRIPTION OF THE FIGURES

Non-limiting exemplary embodiments of the invention are explained in greater detail by way of the drawings, where the same reference numerals refer to the same features.

FIG. 1C shows a horizontal installation of an exemplary embodiment of the instant invention with a sensor on a front or windward face of a sale and a sensor on the back or leeward side of the sail.

DETAILED DESCRIPTION OF AN EXEMPLARY EMBODIMENT OF THE INVENTION

Figure 1A:
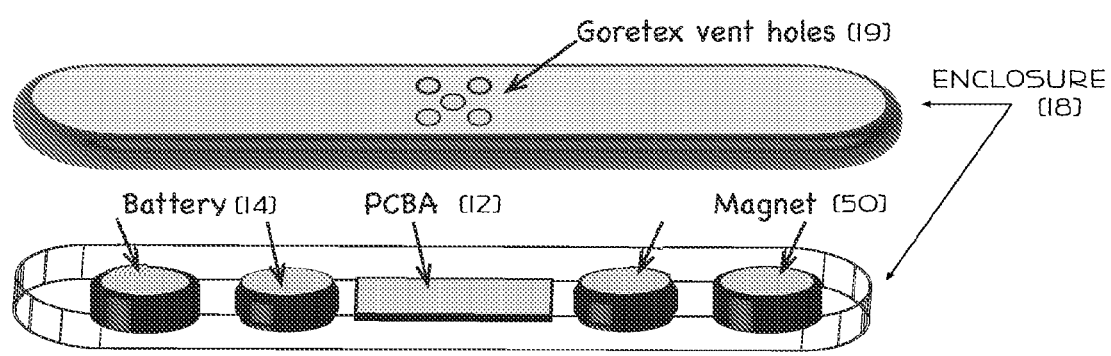
FIG. 1A shows an exploded view of an exemplary embodiment of the invention.

The figures show plan and sectional views of an exemplary embodiment of the sail monitoring system, the individual sensor devices, and the general operation of same as well as existing sails tell tale locations.

The invention utilizes an array of sensors 10 that detect minute variations in barometric pressure and other data on each side of the sail surface. These sensors 10 are connected together to form a network or net 100 across the sail. This connection can be physical, using wires, or it may be wireless, using for example, but certainly not being limited to, Bluetooth LE 5.0 or other wireless topologies or technologies. Finally it may utilize a combination of wired and wireless connections to fit individual situations and can couple with existing terrestrial and satellite ship networks. The sail sensor network 100 is connected to one or more nodes or sensors 10 that collect the raw data and in a non-limiting exemplary embodiment transmit it using Bluetooth or other wireless networking technology to a computing device, such as a smartphone, tablet computer, or other device that has the computing power to provide the user with a visual representation of the data and indicates the state of the sail. A further version of the interface can also suggest the necessary action to correct any imbalance in differential pressure. These systems can be located onboard, in a support vessel, or ashore.

A further aspect of the invention is the ability to sense emergency conditions and adjust the boat to remain stable. Recently, competitive sailing, notably the upcoming presentation of the 36th Americas Cup in 2021, has added foiling arms to the specifications of the boats. This presents several challenges in addition to the importance of accurately determining the amount of thrust being generated by the sails. Foiling sailboats ride on hydrofoil like foil arm extensions and can very easily slip into dangerous instability at a wide range of speeds. Once the boat is outside its performance envelope it can become very dangerous to the crew very quickly. The instant invention further allows for the transmission of adjustments to the control surfaces of the foiling sailboat, for instance winches and steering elements, in a timely manner to avoid unstable conditions. Using predetermined accelerometer data safety cutoffs the accelerometer data detected over the sensor network can be detected in the exemplary embodiment and remediate the controls based on early indicators (e.g. wobble, porpoise etc.) of instability and keeps the boat inside the designed performance envelope.

Adjustments to the various control surfaces of the boat 1 can include but are not limited to, easing or tightening of sail trim lines 40 (called sheets) on the sail 20,30 mounted to the mast 2 changing the sail(s) 20,30 shape to increase or decrease the acceleration power or thrust. We can also control the heading and direction of the boat in relation to the wind by heading up or falling off (relative to wind) typically through rudder controls. And in the case of boats with foiling arms noted above, the foils on the arms. Using these control systems and other measures we expect to be able to prevent or at least minimize the impact of catastrophic performance of the foils that can lead to high speed crashes and systemic failures.

Non-limiting exemplary embodiments of the invention are explained in greater detail by way of the drawings, where the same reference numerals refer to the same features. The figures show plan and sectional views of an exemplary embodiment of the sail monitoring system, the individual sensor devices, and the general operation of same as well as existing sails tell tale locations.

Figure 1B:
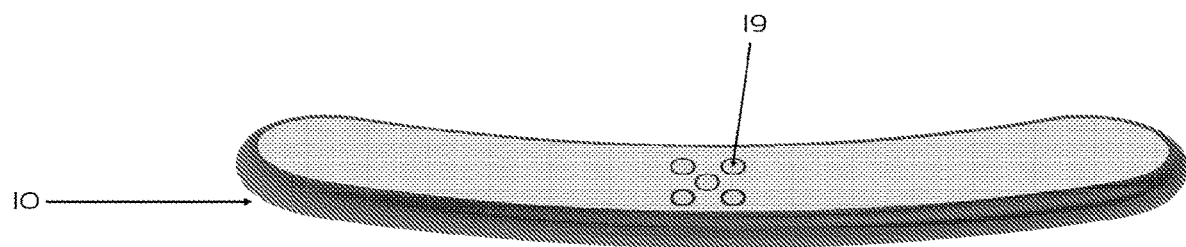
FIG. 1B shows an assembled view showing the flexibility of the enclosure of the instant invention.
Figure 1D:
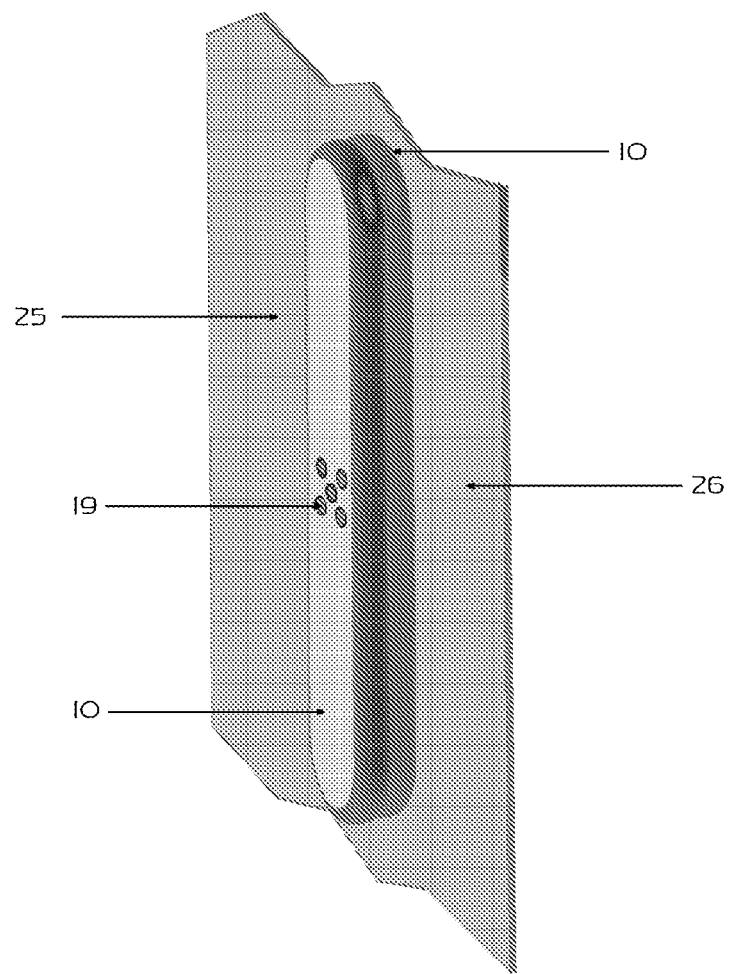
FIG. 1D shows a vertical installation of the exemplary embodiment of FIG. 1C.
Figure 2:
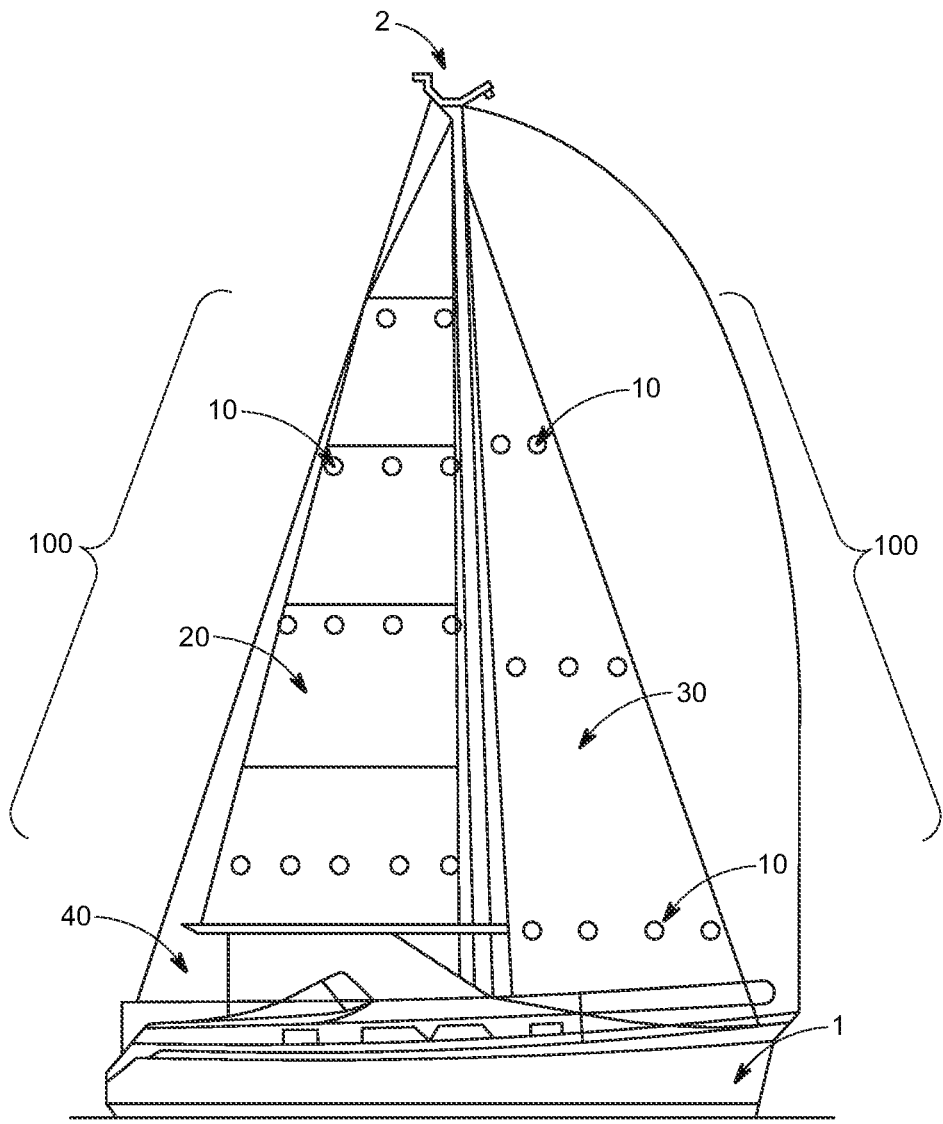
FIG. 2 shows a plan view of the sensor network installed in an exemplary embodiment on a working sail.

In one design, shown as the non-limiting exemplary embodiment of the drawings in FIGS. 1A-2, the sensors are MEMS barometric pressure sensors mounted or attached in pairs, on opposite sides of sail 20, in this instance on the front or windward 25 side and back or leeward side 26, of each other in a number of locations about the sail(s) 20,30, each with its own circuit board 12, battery 14, and transmitter 16. Each would transmit its data to a master node, which can be the computing device or another transmitter.

Figure 3:
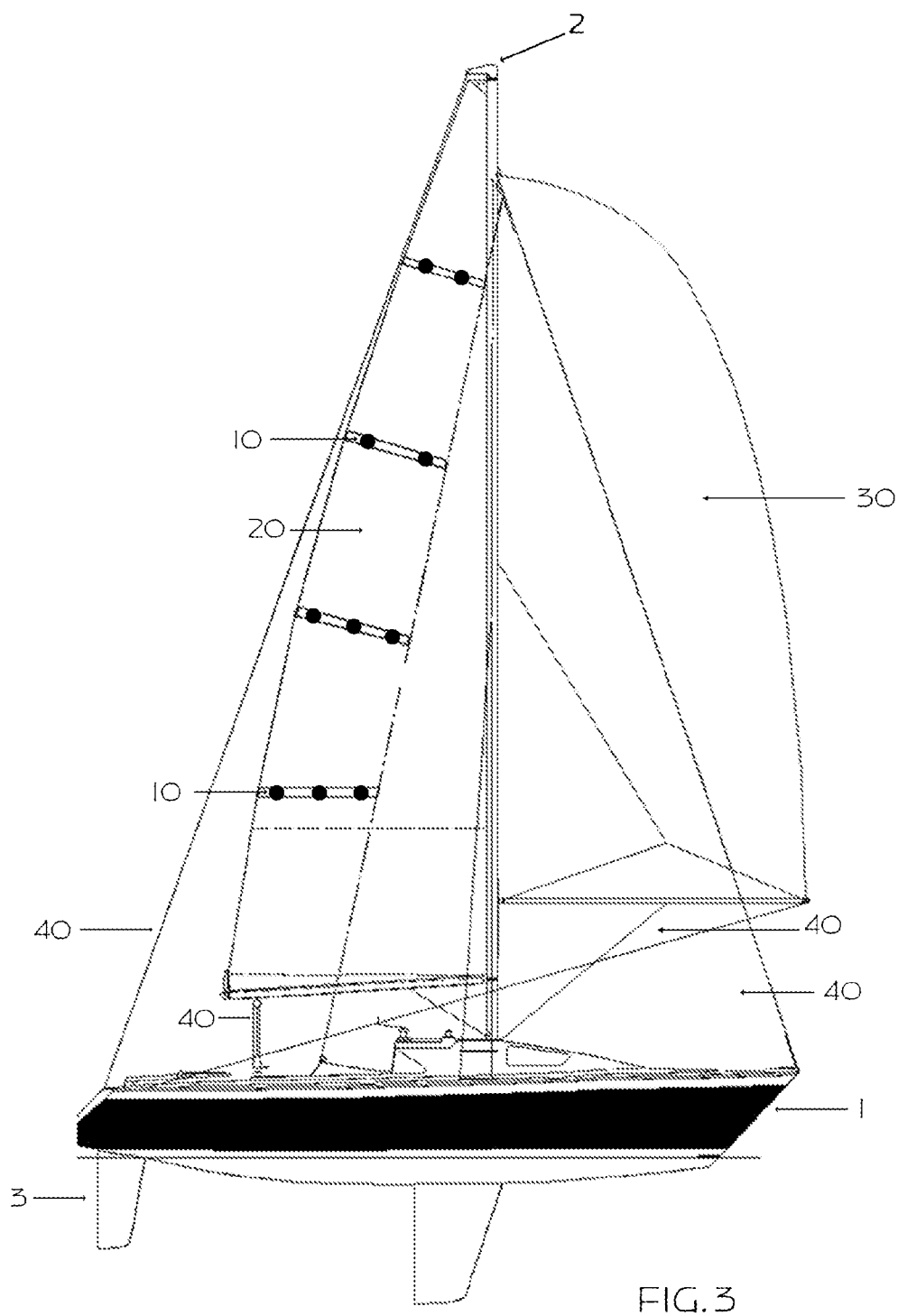
FIG. 3 shows a further view of a similar multi-sail rigged sailboat with an exemplary embodiment of the sensor network installed.

In another design, the sensors 10 can be arranged in a strip of material that can be rubber or thermoplastic material, or fabric such that the strip can be attached to the sail from front to back, from top to bottom, or some other orientation on the sail, as shown in FIG. 3. The material will be designed such that the sail can be "furled" or wrapped around a pole or wire inside of the mast, boom or forestay of the boat so that it does not interfere with proper airflow or operation of the sail.

The individual sensors 10, which can be for instance MEMS barometric sensors, or other types of sensor that can provide the data required and not significantly interfere with the sails performance, are connected along the length of the strip in known intervals and are connected to a node at the end of the strip which contains a main circuit board, battery, and transmitter or provides a method of connection to another strip oriented roughly perpendicularly to the first strip that then leads to a single master node which contains the main circuit board, battery, and transmitter. In both cases, a number of sensor strips or packs can be applied across the surface of the sail to provide the desired density of sensor coverage across the surface of the sail.

The strips can be attached to the surface of the sail(s) 20,30 by attachment devices such as the non-limiting exemplary embodiment shown with magnets 18, or may include adhesives or can be sewn onto the surface of the sail or laminated into the sail cloth itself.

The invention includes the ability, in the form of analytical software and the required algorithms stored on the computing device, to provide a visual representation, in real-time or collected for subsequent analysis, of the sail, aerofoil, or winged surface to the user such that the areas of ideal and less than ideal pressure differential readings are discernible.

The invention will also allow for the heretofore unknown capability of being able to precisely describe the interaction of one or more sails 20, 30 and the airflows moving across them and how they interact. For example, the effect of sail position relative to one another and wind exiting the forward sail 30 on laminar flow or in turbulence and the effect of the condition of wind over another trailing or aft sail 20 or wing surface.

Figure 4:
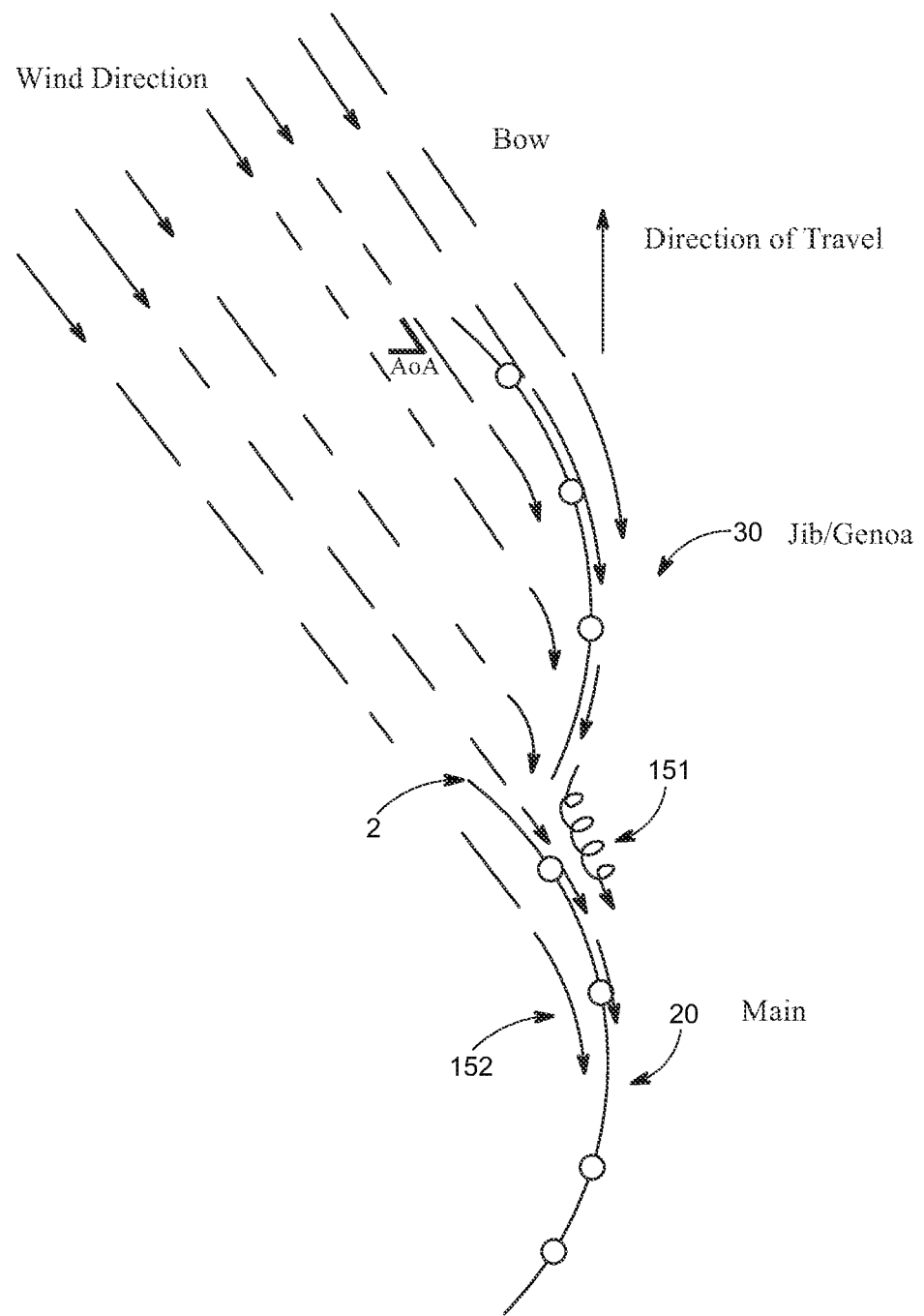
FIG. 4 shows top down views of airflow over a typical sail combination with the exemplary embodiment of FIG. 3 thereon.

FIG. 4 shows a top down view of airflow over a typical sail combination with the exemplary embodiment of FIG. 3 thereon. As noted above, whether a single sail or multiple sails are involved, tightening or loosening the sail from its front edge to its rear edge (e.g. luff to leech) or applying tension vertically from the top of the sail to the bottom (e.g. head to foot) the sensors 10 register the pressure in real time as the wind flows across the sail. As noted previously, sails are designed to take advantage of the Bernoulli principle and other physical principals, similar to airplane wings, essentially creating an idealized airfoil with a pressure differential. By varying the shape of the sail such that it has camber from front to back the profile for the given sail can be idealized for the wind conditions and position of the boat relative to the direction of the wind as shown in FIG. 4.

Typically, the more camber, the more resulting pressure differential and by correlation to the sail size forward thrust, as well as opposing drag is created, up to a point where the induced drag becomes sufficient to be detrimental as previously noted. Additionally, the sail must be situated at an angle about its vertical axis so as to create an "angle of attack" relative to the apparent wind, as shown in FIG. 4. At angles of attack that are too great, the sail "stalls". At the proper angle of attack, laminar airflow over the greatest front to back distance over the sail is created, producing optimum forward thrust Obtaining the ideal sail shape in current conditions and thus maximizing thrust and thereby boat speed is the goal. The instant invention aids in visualizing how the adjustments, for instance, to the angle of attack affect the laminar nature of the flow over the sail and thereby affecting the pressure and thrust generated by sail. This also allows for visualization of the combined interaction of multiple sails, again as noted above.

FIG. 4 shows typical airflow over a two sail rig or configuration in the airflow described, each having camber and adjusted to create a laminar flow. As noted, the top down view is looking toward the deck of boat in a wind with a direction of travel and an angle of attack for each sail relative to the wind (shown in arrows, labeled on drawing). The mast 2 is shown as a reference point as well as an at least two sails, here the main sail 20 and jib 30, and shown diagrammatically with the flow of air as arrows 151,152 traveling across the sails or airfoils 20, 30. Some airflows land on either the main 20 or jib 30 and attach in an orderly, laminar flow 152 as evidenced by the smooth arrows and follow the curvature of the sail. Other air passing between the sails for example is disturbed and turbulent 151 as it passes onto the main 20 from the jib 30. The invention performs two important tasks. First, the sensors measure the even, smooth pressure gradient of the laminar flow over various areas of the sail and provide that information to outside screens and other information systems as described herein. Secondly, the sensors can detect the disturbed turbulent air between the sails and report that information to various screens and systems as described herein. It may be the case that optimizing the first or lead sail degrades the output of the other or trailing sail in a greater amount than the gain. The exemplary embodiment of the invention provides user feedback to enable users to make informed decisions and adjust the shape of the sails relative to one another improve overall performance based on actual real time data and maximize the aggregate thrust from both sails simultaneously.

Figure 5A:
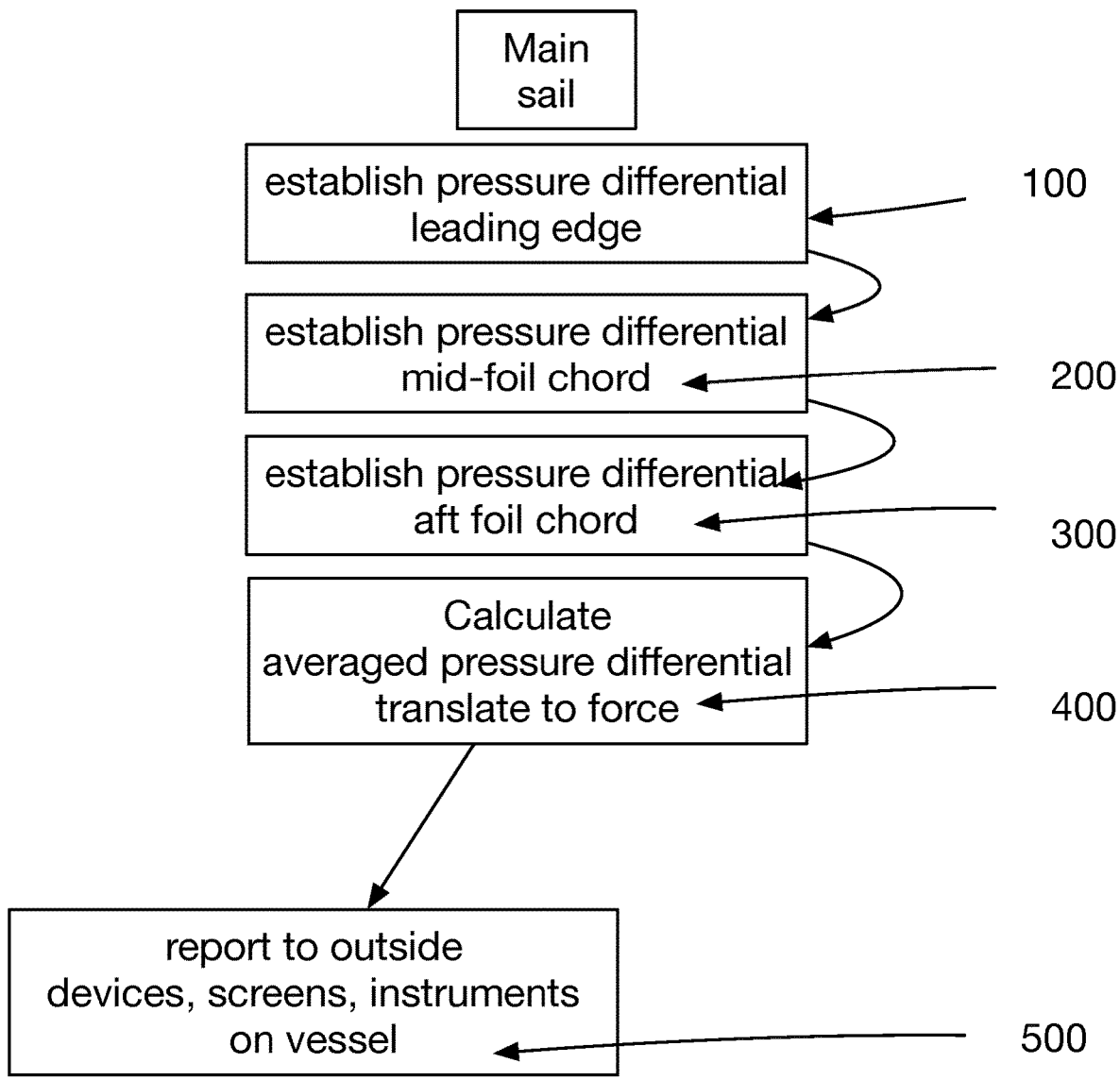
FIGS. 5A and 5B show flowcharts of exemplary embodiments of a method of the invention.
Figure 5B:
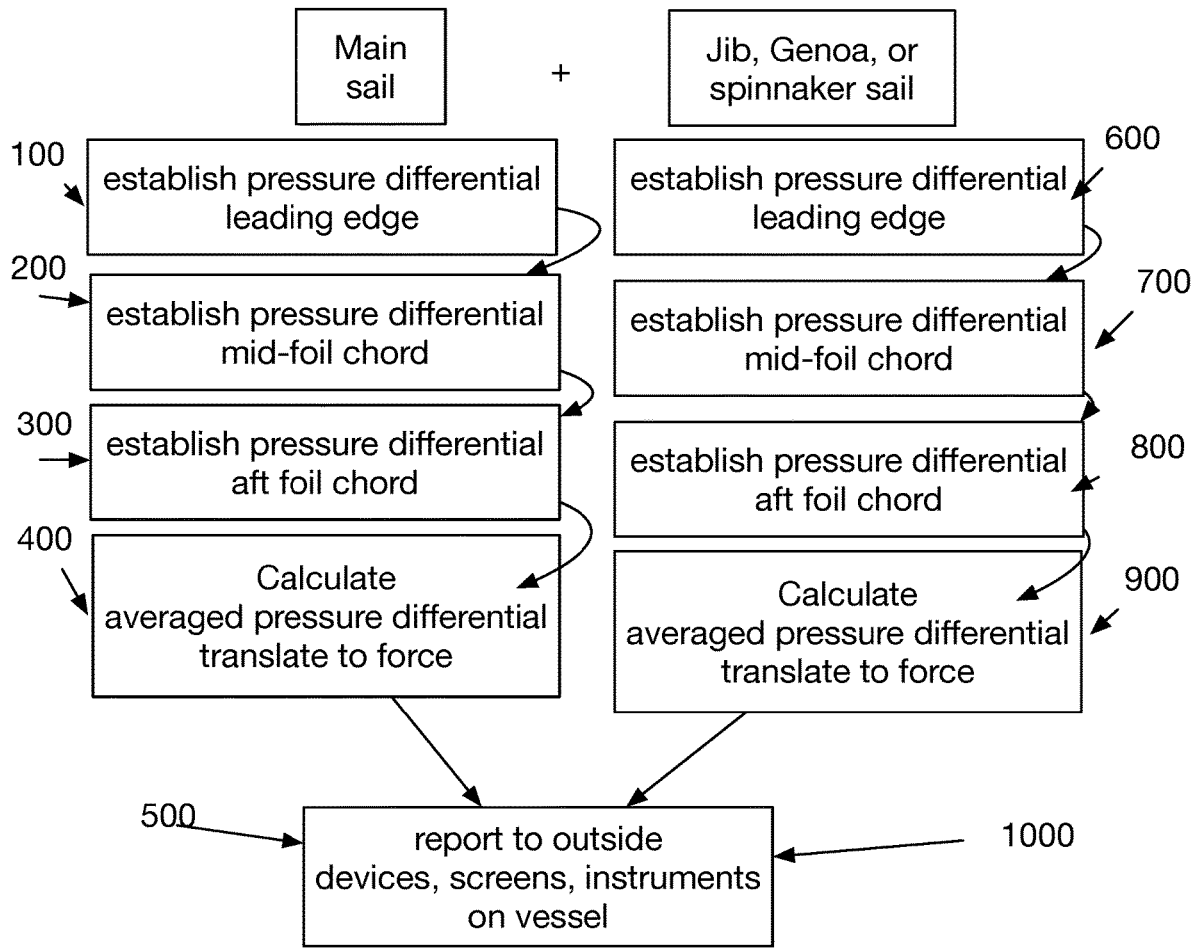

FIGS. 5A and 5B show flowcharts of exemplary embodiments of the method of the instant invention. In FIG. 5A, a single sail is sampled and pressure differentials are established, based in the exemplary embodiment described, on at least three areas or regions of the sail, as similarly shown in FIG. 3 and described throughout the specification, in method steps 100-300. The pressure differentials are measured by pairs of sensors located on either side of the sail or airfoil 20, 30 and collected for calculation for each region or area.

The three areas being sensed in the exemplary embodiment are noted for the leading edge 100, mid-foil 200, and foil chord 300. There can be a greater or lesser numbers of areas or regions of the sails 20, 30 upon which the sensors 10 are attached and calculating pressure differentials. Similarly, fewer or greater numbers of sensors 10 per region or area can be included without departing from the invention, typically this selection is based on the goals of the user, designer, competitor and so on.

This information, can for example, in the non-limiting exemplary embodiment of the method of the invention, be passed over or communicated to an at least one of one network and/or to an at least one device which aggregates the information and calculates a force or thrust calculation for the entire sail 20 or a specific area or region and displays this information. This can then be transmitted to outside instruments, screens, handheld devices, websites, other instruments aboard the vessel or the like in method step 500. Thus, the thrust can be included with the display of differential pressure allowing for real time review of the effect of adjustments for optimization of the sail 20, with the differential calculations visualization in real time and displayed to a user or stored as previously discussed.

In FIG. 5B, the pressure differentials are measured by the at least one sensor mounted in pairs of sensors located on either side of the sail or foil 30 for a second sail of an at least two sails and collected for calculation per region or area in steps 600-900. The regional calculations are similarly situated on the second sail and then aggregated and calculated to determine a force or thrust calculation on the sail 20, 30 in step 500 for both the first and second of the at least two sails, which can for instance but are certainly not limited to a main sail and a jib, Genoa, spinnaker or the like. In the at least two sail case, though the process is identical and runs concurrently on both sails, the system and the method of the system allows for the real time measurement of the dynamics of the sails which are linked as wind travels smoothly over the sail or in a disturbed, turbulent state from one sail to the other. So while the leading sail (Jib, Genoa, or Spinnaker) may be generating force efficiently, it may leave in its wake disturbed air that hampers the following or main sail. This invention allows for the calculations of force on each and a combined total to show how adjustments change the interaction of the sails upon one and other.

The embodiments and examples discussed herein are non-limiting examples. The invention is described in detail with respect to non-limiting exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method of operating an electronic sail shape network comprising:

sensing differential pressure from a windward side to a leeward side at an at least one area on a first of an at least one sail using an at least one sensor mounted on the first sail of the at least one sail on each side of the first sail of the at least one sail;

establishing pressure differential from one or more areas of the first sail of the at least one sail;

calculating averaged pressure differential across the one or more areas of the first sail of an at least one sail; and determining a thrust calculation based on the average pressure differential wherein the thrust calculation is transmitted to an at least one display and/or an at least one a storage device in real time.

2. The method of claim 1, further comprising the method step of calculating a sail shape based on the sensed differential pressure for each of the one or more areas of the first of the at least one sails.

3. The method of claim 2, further comprising the method step of transmitting average pressure differential to the display as a visual representation over the sail shape.

4. The method of claim 1, wherein the at least one sensor mounted on the first sail of the at least one sail on each side of the first sail of the at least one sail forms a network of sensed differential pressures across the first sail of the at least one sail.

5. The method of claim 4, wherein the sensing step having the at least one sensor has the sensors mounted on the first sail of an at least one sail in pairs.

6. The method of claim 1, wherein the at least one sail comprises at least two sails and the method further comprises;
   sensing additional differential pressures from a windward side to a leeward side at an at least one area on a second of the at least two sails using an at least one additional sensor mounted on the second sail of an at least two sails on each side of the second sail;
   establishing pressure differential from one or more areas of the second sail of an at least two sails;
   calculating averaged pressure differential across the one or more areas of the second sail of an at least two sails; and
   determining a thrust calculation for the first sail and second sail of the at least two sails based on the average pressure differential for each sail, wherein the thrust calculation for each sail is transmitted to a display or storage device in real time.

7. A sail shape network monitor and emergency shut down system, comprising:
   at least one sensor mounted on a first of an at least two sails on a boat;
   at least one additional sensor mounted on a second of an at least two sails on a boat;
   an at least on transceiver sending and receiving signals and transmitting data with the at least one sensor on the first sail of the at least two sails and the at least one additional sensor on the second sail of the at least two sails;
   an at least one accelerometer;
   an at least one wind meter;
   an at least one data processing unit;
   an at least one network created at least in part by the at least one sensor on the first of the at least two sails and the at least one additional sensor on a second of the at least two sails, the at least one accelerometer, the at least one wind meter, and the data processing unit; and
   an at least one program stored on the network and communicating with the processing unit calculating a performance envelope from the transmitted data, wherein the network of sensors detects and transmits data to the data processing unit such that the data processing unit detects when an out of control condition is imminent in the boat.

* * * * *